July 6, 1937.   J. W. MOORE   2,085,922
PIPE JOINT
Filed Nov. 17, 1934   2 Sheets-Sheet 2
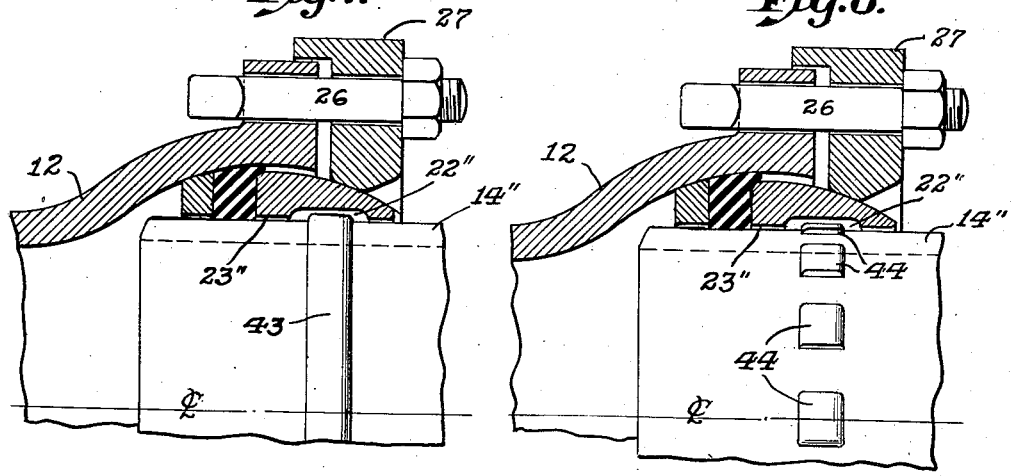
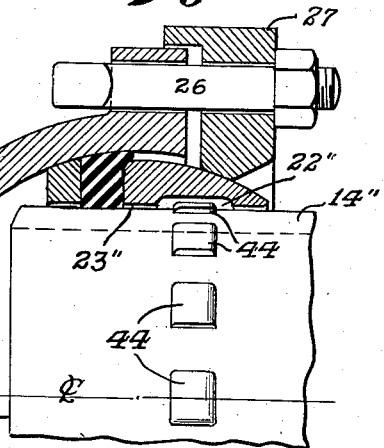
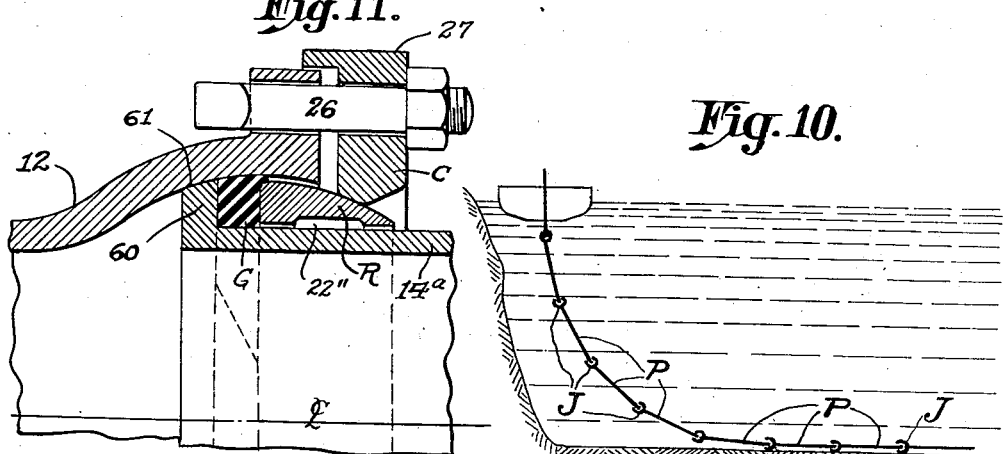
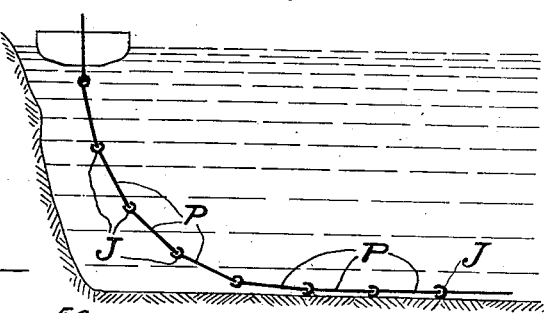
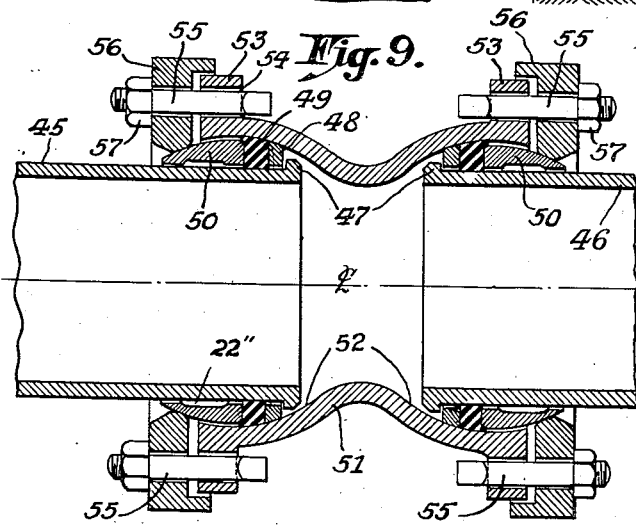
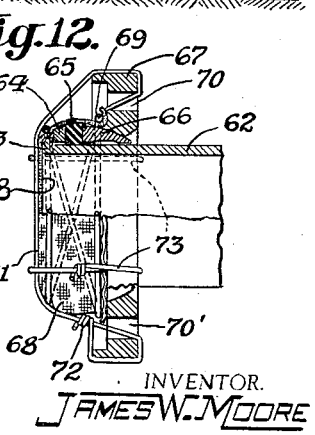
INVENTOR.
JAMES W. MOORE
BY
J. Granville Meyers
ATTORNEY.

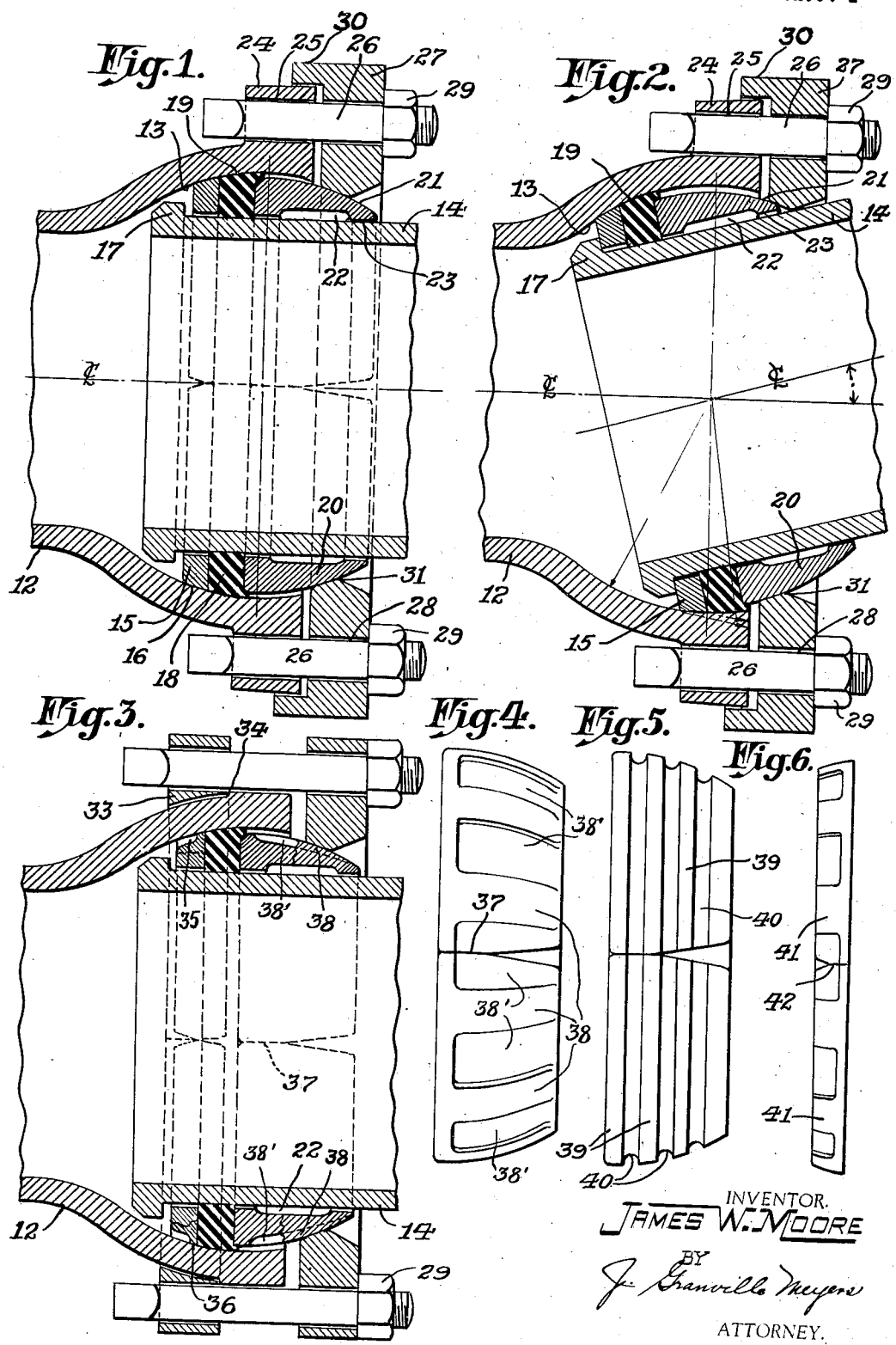

Patented July 6, 1937

2,085,922

UNITED STATES PATENT OFFICE 2,085,922

PIPE JOINT

James W. Moore, Birmingham, Ala., assignor to American Cast Iron Pipe Company, Birmingham, Ala., a corporation of Georgia Application November 17, 1934, Serial No. 753,539

4 Claims. (Cl. 285—94)

My present invention relates to pipe joints, and particularly to flexible or ball joints for use in connecting sections of pipe in various types of service.

An important object of my present invention is to provide a joint of the above character constructed and arranged to afford high flexibility of the joint by relative rocking movements of the pipe sections relative to each other, as well as for longitudinal expansion and contraction of the pipe sections relative to each other while maintaining the pipes positively and tightly locked against separation to prevent leakage.

More specifically, the objects of the invention include the provision of cooperating elements assemblable on the spigot end of one pipe section to form thereon a ball joint member to cooperate with a socket in the bell end of another pipe section or coupling, with due provision for simplicity in construction, facility in assembly, and extreme effectiveness in accomplishing the general objects above stated.

In accomplishing the foregoing objects, it is possible to utilize several modifications, some of which I have shown in the accompanying drawings as being typically illustrative, but before proceeding with the detailed description of the drawings, I will generally point out the essential features of the invention.

In practicing the invention and to provide a flexible or universal joint of the ball and socket type, as embodied in the bell and spigot form of joint I provide, on the bell end of one section of pipe, a semi-spherical socket formed on an arc of a given radius according to the diameter of the pipe. This socket receives the spigot end of the other section on which I provide what I term a "built-up ball". The "built-up ball" is in the nature of several parts comprising essentially a retainer ring, a gasket or packing ring and a gland lip ring. The gasket or packing ring is disposed between the retainer ring and gland lip ring and is compressed therebetween. The peripheries of these parts is such as to cooperate with the socket in the bell section of pipe and conforms substantially in curvature to the inner surface of the socket. Of course, both the "built-up ball" and the inner surface of the socket have a curvature corresponding to a section of a sphere. The complete joint also includes means for tightly compressing the gasket or packing ring between the retainer ring and the gland lip ring, and the preferred construction and arrangement is such as to permit or afford longitudinal or sliding movement of the respective pipe sections relative to each other at the joint, as well as universal or rocking movements relative to each other at the joint without leakage.

Another object of the invention is to provide for assembly and shipment of the several parts of the "built-up ball" and retainer ring in proper relation on the pipe, and to afford protection to the assembled parts during shipment.

In the drawings

Fig. 1 is a longitudinal vertical sectional view through a pipe joint embodying a preferred form of the invention;

Fig. 2 is a view of the structure shown in Fig. 1 illustrating the flexibility of the joint with one section canted relative to the other;

Fig. 3 is a view similar to Fig. 1 showing a slight modification;

Figs. 4 and 5 are side elevations of different forms of gland lip rings;

Fig. 6 is a side elevation of a retainer ring;

Fig. 7 is a fragmentary sectional view similar to Fig. 1 showing a modification in the means for limiting the longitudinal relative movements of the pipe sections;

Fig. 8 is a view similar to Fig. 7 showing a modification in the construction of the means for limiting the longitudinal movements of the pipe sections;

Fig. 9 is a view similar to Fig. 1 showing a further modification in the invention by providing a double socket coupling;

Fig. 10 is a diagrammatic view showing a plurality of sections of pipe connected in accordance with any of the forms of the invention being installed or laid for submarine use;

Fig. 11 is a view similar to Fig. 1 showing a still further modification of the invention; and Fig. 12 is a reduced view partly in elevation and partly in section of the spigot end of a pipe showing the "built-up ball" and retainer ring assembled and held thereon for shipment.

In Figs. 1 and 2, the numeral 12 designates a section of pipe, in the bell end of which is formed an arcuate surface 13 to provide a socket to receive the spigot end of another section 14 carrying the "built-up ball". The numeral 15 designates the retainer ring which may be a single split ring or a sectional ring, and which is provided with an arcuate outer surface 16 to cooperate with or engage the inner surface 13 of the bell section. The inner or spigot end of section 14 is formed with a flange 17 either cast as an integral part thereof or welded or otherwise secured thereto. The compressible gasket ring 18 when compressed acquires an arcuate outer surface 19 to engage part of the surface 13. The gasket 18 may be either a one piece solid or split ring. The gland lip ring 20 may be cast in one piece and split to enable it to be stretched over the flange or bead 17 in the same manner as the retainer ring 15 and gasket 18, or it may be in two or more sections. The exterior of the gland lip ring 20 is formed with a spherical surface 21 which may be plain or fluted or ribbed, as presently described. The inner surface of the gland lip ring may be recessed at 22 to provide relatively narrow pad surfaces 23 to minimize the grinding that may be necessary to insure the proper fit of the gland lip ring over the spigot end of the pipe 14.

The bell end of the section 12 is provided with a flange 24 having openings 25 to receive bolts 26. A clamping ring 27 surrounds the gland lip ring 20 and is provided with openings 28, through which the bolts 26 also extend, and the outer ends of the bolts are screw threaded to receive nuts 29 which when tightened force the gland lip ring tightly against the gasket 18, so that the gasket is compressed between the gland lip ring and the retainer ring 15 to form a fluid tight joint. The clamping ring 27 is provided with an annular flange 30 which may have a telescoping fit with the flange 24 of the bell section to protect the bolts 26 from bending or lateral stress. The clamping ring 27 is also provided with an arcuate surface 31 on its interior which contacts the curved surface 21 of the gland lip ring.

It should be apparent that the parts constituting the "built-up ball", namely, retainer ring, gasket and gland lip ring, may be applied to the spigot end of the pipe at the time of shipping the same to be inserted within the socket in the bell end of the other section with facility when the pipe line is laid, after which the bolts are inserted through the clamping ring and flange on the other section and tightened to compress the packing and unite the two sections against separation and yet permitting relative rocking and longitudinal movements.

In Fig. 1, the respective pipe sections are shown with their longitudinal axes alined, but in Fig. 2 the section 14 is shown inclined relative to the section 12, and it will be noted that the "built-up ball" or parts 15, 18 and 20 have moved as a unit or "built-up ball" within the socket along the surface 13, without, however, loosening the fluid tight joint. Also in Fig. 1, the bead or flange 17 of the section 14 is shown spaced from the retainer ring 15, whereas in Fig. 2, the bead or flange 17 is in contact with the retainer ring 15, due to relative longitudinal as well as rocking movement between the pipe sections. It will be understood that with the pipes in the position of Fig. 1 they may have relative sliding or longitudinal movement without relative rocking movement, and that the pipes may also have relative rocking movement without relative sliding or longitudinal movement. In other words, contraction and expansion controls the relative sliding or longitudinal movement, while lateral stresses control the rocking movement. Due to the fact that the gasket 18 is tightly compressed between the gland lip ring and the retainer ring and tightly engages the curved surface 13 of the section 12 and the outer surface of the section 14, the fluid tight joint is maintained under either or both of the said possible relative movements of the pipe sections.

In Fig. 3, I have shown substantially the same construction and arrangement of parts as in Fig. 1, and the primed numerals designate the corresponding unprimed numerals of Figs. 1 and 2. The difference between the structure of Fig. 3 and that of Fig. 1 is that instead of forming the annular flange on the bell section at the extreme end thereof, I provide a separate clamping ring 33 which fits over the bell end and engages a shoulder or annular abutment 34 on the bell end. Another difference resides in the retainer ring 15 which instead of having a smooth outer surface is recessed at 35 the same as the gland lip ring and for the same reason, namely, to give narrow pad surfaces 36 to bear against the curved wall of the socket or bell and the outer surface of the gland lip ring is recessed at 38'. Otherwise, the construction and relative movement of the pipe sections and the "built-up ball" and socket is the same as that of Figs. 1 and 2.

In Fig. 4 the gland lip ring is shown provided with a split 37 and with ribs or flutes 38 and recesses 38' extending longitudinally thereof; while in Fig. 5 the gland lip ring is shown provided with circumferential ribs 39 separated by grooves 40. These views are merely to illustrate the different possible constructions of the gland lip rings and to reduce the amount of surface contact between the gland lip rings and the clamping rings.

In Fig. 6 one of the retainer rings is illustrated formed with longitudinal flutes 41 and a split 42, in the manner of the gland ring of Fig. 4.

In Fig. 7, I have shown a modification in respect to the means for limiting the relative longitudinal movements of the respective sections. Whereas, in Figs. 1-3, the section 14 is provided on its end with an annular bead or flange 17 to contact the retainer ring 15 within the socket, in Fig. 7 the section 14", corresponding to the section 14 of Fig. 1, is shown provided with an annular rib 43 remote from its end and located within the recess 22" of the gland lip ring. Obviously, the pads 23" of the gland lip ring provide stops or abutments for engagement by the rib 43 to retain the end of the section 14" within the joint and in contact with the gasket during relative longitudinal or sliding movements.

In Fig. 8 the construction and arrangement is the same as in Fig. 7, with the following exception. Instead of providing a continuous annular rib or band around the section 14", I provide a circumferential row of projections or lugs 44 located within the recess 22" to contact the pads 23" to maintain the end of the section 14" within the joint and contacted by the gasket.

In Fig. 9, I have illustrated how ball joints embodying the features of the invention above described may be constructed in the form of a coupling adapted to receive confronting ends of two pipe sections. In this modification of the invention, I have shown the two confronting ends of the pipe sections formed with annular beads or flanges at their ends to limit the relative longitudinal movement of each section relative to the coupling. It should be apparent, however, that the modifications of Figs. 7 and 8 for accomplishing the same purpose may be utilized.

In Fig. 9 the numerals 45 and 46 designate the ends of two pipe sections which are alined with each other, and each of which is shown provided with an annular bead or flange 47 to abut the retainer rings 48 which serve, as in the other embodiments of the invention above described, to assist in compressing the gaskets 49 which are forced against the retainer rings by the gland lip rings 50 which may be constructed in accordance with any of the various forms above described. The coupling comprises a tubular member 51 having at its opposite ends sockets 52, each being in the nature of a section of the sphere, so that the curved inner walls of the sockets will properly cooperate with the retainer rings 48, gaskets 49 and gland lip rings 50, in the manner previously described. At each end of the coupling 51 is an annular flange 53 provided with openings 54 to receive bolts 55 which extend also through openings in the clamping ring 56 to receive on their outer ends nuts 57 to force the clamping rings and gland lip rings inwardly to compress the gaskets. Under the construction and arrangement of parts shown in Fig. 9, I provide for greater deflections or movements of the pipe sections relative to each other and also obtain the feature of the relative sliding or longitudinal movements of the pipe sections relative to each other and/or relative to the coupling.

In Fig. 10, I have illustrated how the invention in any of the forms above described is well adapted for submarine service or river crossings and other installations requiring excessive joint deflections. In Fig. 10 the various sections of the pipe are designated by the letter P and the ball joints by the letter J. It will be noted from Fig. 10 that the connected sections of pipe may be laid across rivers or lakes direct from a barge in any depth of water up to several hundred feet without the use of deep sea divers. Several of the sections are shown resting on the bed of the river or lake while other sections lead up to the barge from those already laid in an arc forming substantially a quarter of a circle. The connected sections can also be pulled across rivers with a cable, thereby effecting marked economies in this type of heretofore expensive installations.

In Fig. 11 I have shown a further modification in the ball socket joints which is substantially the same as the constructions of Figs. 1-8, except that the retainer ring is dispensed with and is replaced by a flange 60 on the end of the spigot section 14a. The outer or peripheral surface of the flange 60 is arcuate to cooperate with the arcuate surface of the socket on the bell section of pipe as indicated at 61. Otherwise the gasket G, gland lip ring, clamping ring C and the connecting and compressing elements are the same as in the other figures of the drawings. Although the gasket G and gland lip ring R are built-up on the spigot end of the pipe 14a to form the ball, and due to the formation of their surfaces which cooperate with the socket and with the clamping ring C made for rocking movement, the longitudinal or sliding movement is prevented, because the surface of the flange 60 snugly engages the socket and serves only to cooperate with the other elements in compressing the gasket and in moving therewith during relative rocking movements of the section 14a.

Referring to Fig. 12, the numeral 62 designates the spigot end of a section of pipe provided on its end with the bead or flange 63, similar to flange 17 of Fig. 1, and against which is the retainer ring 64, with gasket 65 between the retainer ring and the gland lip ring 66. Parts 64, 65 and 66 correspond to parts 15, 18 and 20 of Fig. 1. The clamping ring 67 is also mounted on the section of pipe, and a protective covering of burlap, or the like, 68 is wrapped around the gland lip ring, gasket, retainer ring and covers the end of the pipe and bead 63. A wire 69 is bound around the burlap circumferentially of the gland lip ring, gasket, and retainer ring 64, and the wire is then threaded through one of the bolt openings 70 and then bent around the clamping ring and across the end of the pipe, as indicated at 71, and then through the opposite bolt opening 70', after which it is again bent around the retainer ring and tied upon itself as at 72. Similar wires 73 are threaded through transversely opposite bolt openings and tied upon themselves maintaining the parts in properly assembled relation against separation for shipment.

In making the assembly, the clamping ring 67 is first inserted over the spigot end of the pipe 62, and then the gland lip ring 66, gasket 65, and retainer ring 64 are placed around the pipe in the relative positions shown. The burlap 68 is then applied and the wire is then wrapped circumferentially around the burlap, preferably as shown in Fig. 12, that is, crossing itself, and is then threaded through the bolt openings 70 and 70' and tightened to draw and hold the parts together. Obviously, when the assembled parts arrive at the place where they are to be used, it is only necessary to cut the wires, remove the burlap, insert the built-up ball within the bell end of another pipe section, apply the bolts and tighten them as previously explained.

I claim:

1. In a gland-packed pipe joint capable of considerable lateral deflection, a socket having an inner segmental spherical surface on the end of one pipe, a ball built up on the end of another pipe and longitudinally movable thereon comprising a retainer ring and a gasket the outer surfaces of which are disposed inside of the outer edge of said spherical surface and are so proportioned and arranged that the outer surface of the gasket has a circumferentially continuous bearing upon said spherical surface in all relative positions of the pipes, a gland ring having a substantially flat surface bearing upon the gasket and having a spherically surfaced portion extending beyond the socket, a clamping ring engaging the spherical surface of the gland ring, means for attaching the clamping ring to the first pipe arranged to cause the gland ring to exert a longitudinal pressure on the gasket, and means for limiting the longitudinal movement of the pipe in the ball.

2. In a gland-packed pipe joint capable of considerable lateral deflection, a socket having an inner segmental spherical surface on the end of one pipe, a ball built up on the end of another pipe and longitudinally movable thereon comprising a retainer ring and a gasket the outer surfaces of which are disposed inside of the outer edge of said spherical surface and are so proportioned and arranged that the outer surface of the gasket has a circumferentially continuous bearing upon said spherical surface in all relative positions of the pipes, a gland ring having a substantially flat surface bearing upon the gasket and having a spherically surfaced portion extending beyond the socket, a clamping ring engaging the spherical surface of the gland ring, means for attaching the clamping ring to the first pipe arranged to cause the gland ring to exert a longitudinal pressure on the gasket, and a lateral projection on the end of said other pipe between the retainer ring and the adjacent part of the socket arranged to limit the longitudinal movement of the pipe in the ball.

3. In a gland-packed pipe joint capable of considerable lateral deflection, a socket having an inner segmental spherical surface on the end of one pipe, a ball built up on the end of another pipe and longitudinally movable thereon comprising a retainer ring and a gasket the outer surfaces of which are disposed inside of the outer edge of said spherical surface and are so proportioned and arranged that the outer surface of the gasket has a circumferentially continuous bearing upon said spherical surface in all relative positions of the pipes, a gland ring having a substantially flat surface bearing upon the gasket and having a spherically surfaced portion extending beyond the socket, an annular groove in said gland ring, a clamping ring engaging the spherical surface of the gland ring, means for attaching the clamping ring to the first pipe arranged to cause the gland ring to exert a longitudinal pressure on the gasket, and a lateral projection on said other pipe located within the groove in the gland ring and movable therein arranged to limit the longitudinal movement of the pipe in the ball.

4. In a gland-packed pipe joint capable of considerable lateral deflection, a socket having an inner segmental spherical surface on the end of one pipe, a ball built up on the end of another pipe comprising a retainer ring and a gasket, the outer surfaces of which are disposed inside of the outer edge of said spherical surface and are so proportioned and arranged that the outer surface of the gasket has a circumferentially continuous bearing upon said spherical surface in all relative positions of the pipes, a gland ring having a surface bearing upon the gasket and having a spherically surfaced portion extending beyond the socket, a clamping ring engaging the spherical surface of the gland ring, and means for limiting the lateral deflection of the pipes.

JAMES W. MOORE.